(12) United States Patent
Bell et al.

(10) Patent No.: US 11,139,703 B2
(45) Date of Patent: Oct. 5, 2021

(54) COIL WINDING ARRANGEMENT

(71) Applicant: PROTEAN ELECTRIC LIMITED, Surrey (GB)

(72) Inventors: Jamie Bell, Berkshire (GB); Samuel Broadbridge, Hampshire (GB)

(73) Assignee: PROTEAN ELECTRIC LIMITED, Surrey (GB)

( * ) Notice: Subject to any disclaimer, the term of this patent is extended or adjusted under 35 U.S.C. 154(b) by 577 days.

(21) Appl. No.: 15/534,862

(22) PCT Filed: Dec. 4, 2015

(86) PCT No.: PCT/IB2015/059366
§ 371 (c)(1),
(2) Date: Jun. 9, 2017

(87) PCT Pub. No.: WO2016/092437
PCT Pub. Date: Jun. 16, 2016

(65) Prior Publication Data
US 2017/0353063 A1    Dec. 7, 2017

(30) Foreign Application Priority Data
Dec. 12, 2014   (GB) .............................. GB1422131.1

(51) Int. Cl.
*H02K 1/18* (2006.01)
*H02K 1/14* (2006.01)
(Continued)

(52) U.S. Cl.
CPC .............. *H02K 1/18* (2013.01); *H02K 1/148* (2013.01); *H02K 3/18* (2013.01); *H02K 3/325* (2013.01);
(Continued)

(58) Field of Classification Search
CPC .... H02K 15/08; H02K 1/148; H02K 15/0442; H02K 15/095; H02K 1/18;
(Continued)

(56) References Cited

U.S. PATENT DOCUMENTS 6,127,753 A * 10/2000 Yamazaki .............. H02K 3/522
310/194
7,498,709 B2 * 3/2009 Shteynberg .......... H02K 15/022
242/445
(Continued)

FOREIGN PATENT DOCUMENTS

EP    1684399 A2    7/2006
EP    1729398 A2    12/2006
(Continued)

OTHER PUBLICATIONS

European Patent Office, International Search Report, dated Aug. 4, 2016, WIPO, Rijswijk.
(Continued)

*Primary Examiner* — Bernard Rojas
(74) *Attorney, Agent, or Firm* — Nolte Lackenbach Siegel (57) ABSTRACT

An arrangement for mounting a coil winding on a stator tooth, the arrangement comprising a mounting element having a first mounting arm for receiving a first stator tooth and a second mounting arm for receiving a second stator tooth, wherein the first mounting arm is movable relative to the second mounting arm between a first position and a second position; means for mounting an electrical conductor on the first stator tooth and the second stator tooth when the first mounting arm is in the first position relative to the second mounting arm to form a coil winding on the first stator tooth and the second stator tooth; and means for placing the first mounting arm in the second position relative to the second mounting arm when the conductor has been mounted on the first stator tooth and the second stator tooth
(Continued)

to allow the first stator tooth and the second stator tooth to be removed from the first mounting arm and the second mounting arm respectively.

11 Claims, 10 Drawing Sheets

(51) Int. Cl.
*H02K 3/18* (2006.01)
*H02K 15/095* (2006.01)
*H02K 3/32* (2006.01)
*H02K 3/52* (2006.01)
*H02K 15/04* (2006.01)

(52) U.S. Cl.
CPC .......... *H02K 3/522* (2013.01); *H02K 15/095* (2013.01); *H02K 15/0442* (2013.01); *H02K 2203/12* (2013.01)

(58) Field of Classification Search
CPC ...... H02K 2203/12; H02K 3/18; H02K 3/325; H02K 3/522; H05K 15/085
USPC .......................................... 310/208, 214–215
See application file for complete search history.

(56) References Cited

U.S. PATENT DOCUMENTS

| | | | | |
|---|---|---|---|---|
| 8,482,180 | B2* | 7/2013 | Seki | H02K 3/522 310/215 |
| 9,369,018 | B2* | 6/2016 | Tanaka | H02K 15/095 |
| 9,634,533 | B2* | 4/2017 | Uchitani | H02K 3/30 |
| 2003/0030345 | A1 | 2/2003 | Enomoto et al. | |
| 2006/0279146 | A1* | 12/2006 | Ishigami | H02K 3/522 310/71 |
| 2011/0241472 | A1* | 10/2011 | Tanaka | H02K 15/095 310/208 |
| 2015/0188374 | A1* | 7/2015 | Homsy, III | H02K 15/095 310/198 |

FOREIGN PATENT DOCUMENTS

| | | |
|---|---|---|
| EP | 2330722 A2 | 6/2011 |
| GB | 2507072 A | 4/2014 |
| JP | H11220844 A | 8/1999 |
| WO | 2011155327 A1 | 12/2011 |

OTHER PUBLICATIONS

European Patent Office, Written Opinion of the International Searching Authority, dated Jun. 17, 2016, WIPO, Munich.

Intellectual Property Office, Combined Search and Exam Report, dated Jan. 8, 2015, IPO, Newport, South Wales.

Intellectual Property Office, Search Report, dated Jan. 8, 2015, IPO, Newport, South Wales.

* cited by examiner

COIL WINDING ARRANGEMENT

The present invention relates to a coil winding arrangement, in particular an arrangement for winding a coil on a stator tooth.

Stators are well known as the stationary part of an electric motor or electric generator about which a rotor turns. Stators generally comprise a magnetic component and other structural components. Electric motors work on the principle that a current carrying wire will experience a force in the presence of a magnetic field. Typically a rotor, carrying a set of permanent magnets, is arranged to rotate about a set of coils mounted on a stator that are arranged to carry an electric current, resulting in the rotor rotating about the stator and generating movement. It will be appreciated that it is also possible for the rotor to carry a set of coils and the stator to carry a set of permanent magnets.

Figure 1:
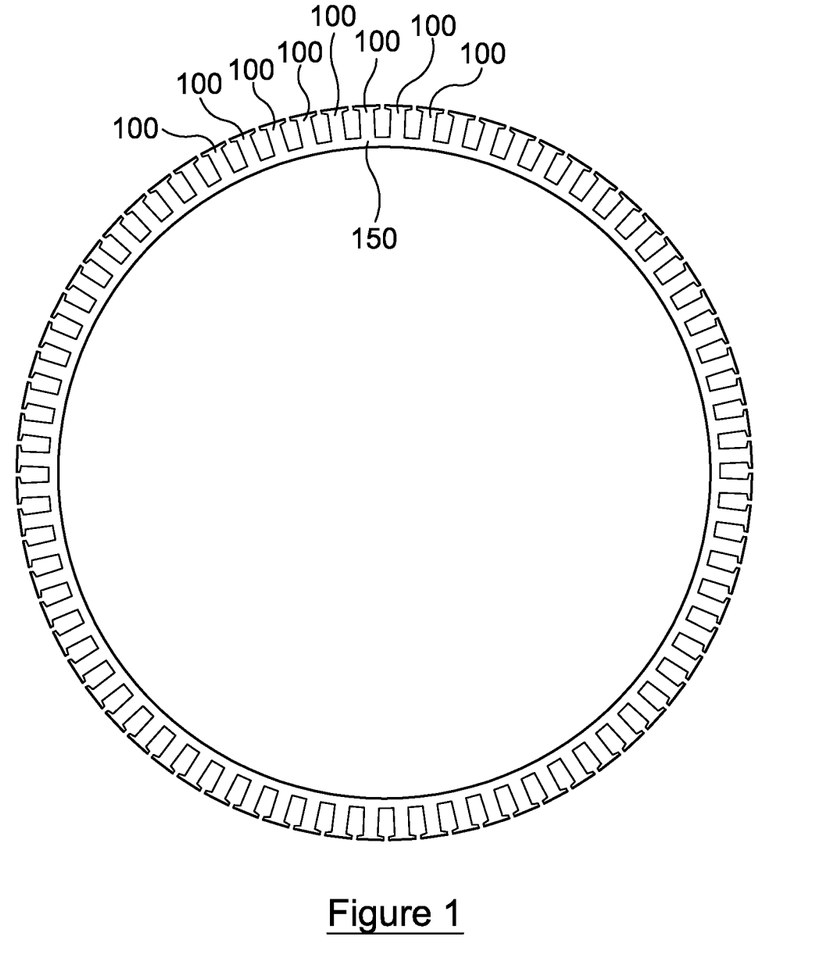
FIG. 1 illustrates a prior art stator.

An example of a stator, which is arranged to be mounted within a rotor, is shown in FIG. 1. FIG. 1 shows the back-iron of a stator formed of a single piece of material, for example from PM (powder metal) or more commonly built up of a number of identical laminations. The protrusions 100 from the circular support 150 (also known as a back iron or back ring) are known as "teeth" and are used to receive a plurality of coil windings. To increase performance of a motor it is desirable to optimise the total cross-section of the coil windings, which would have the effect of reducing resistance, thereby reducing heat generation. Additionally, with the coil windings being in closer proximity, this would have the effect of improving thermal conductivity, which would have the effect of increasing motor efficiency with improved continuous performance.

However, with an arrangement such as that shown in FIG. 1, where the entire stator is formed of a single solid piece, it will be appreciated that there is a limited amount of space to physically wind the wire coils about the teeth. Therefore, it is common in such arrangements for there to be gaps between the coils of adjacent teeth, which is inefficient since this space could otherwise be filled with wire coils to increase the total cross-section of the coil windings.

Additionally, traditional ways of providing coil insulation between a stator and coil windings can result in poor thermal conductivity, which can limit the performance of an electric motor.

Further, large single piece stators typically require a complex winding machine and complex winding process to perform the required coil windings.

One solution to this problem has been the development of mountable stator teeth, which are mounted to a stator back-iron after coil windings have been formed around the respective stator teeth, for example as described in GB 2477520 and GB 2507072.

However, for a multiphase electric motor, the multiphase electric motor typically includes multiple coil sets, where each coil set is arranged to generate a magnetic field associated with one of the three phases of an alternating voltage, where to increase the number of magnetic poles formed within an electric motor, each coil set will typically have a number of coil sub-sets to produce a rotating magnetic field.

Figure 2:
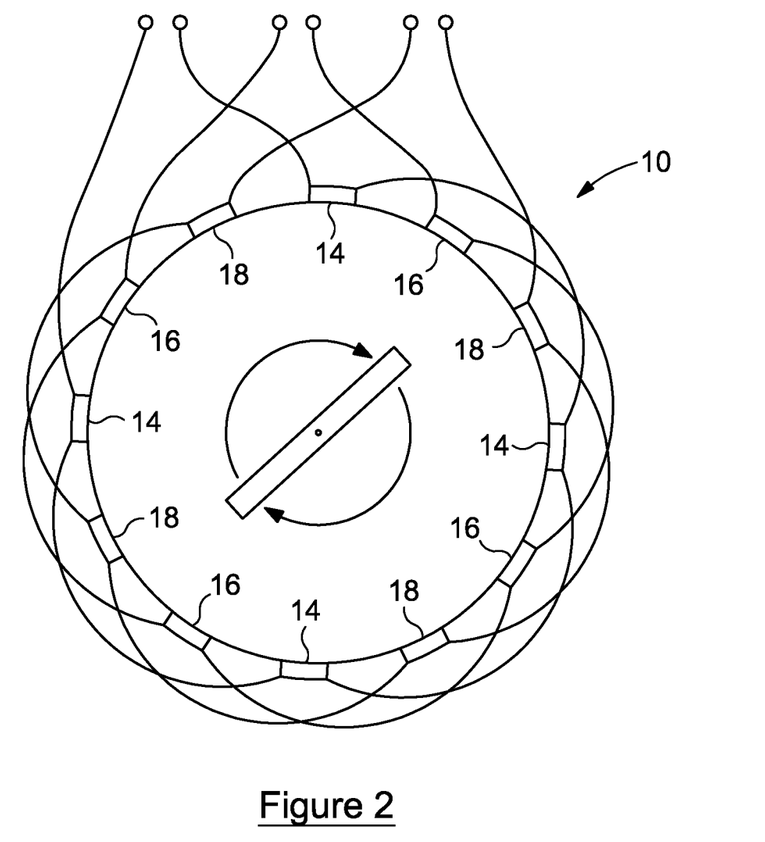
FIG. 2 illustrates a prior art three phase electric motor having a plurality of coil sub-sets.

By way of illustration, FIG. 2 shows a typical three phase electric motor 10 having three coil sets 14, 16, 18. Each coil set consists of three coil sub-sets that are connected in series, where for a given coil set the magnetic field generated by the respective coil sub-sets will have a common phase.

The three coil sets of a three phase electric motor are typically configured in either a delta or wye configuration.

In one configuration, however, the coil sub-sets that form each coil set may be located adjacent to each other, for example for an electric motor having a plurality of sub motors. In this configuration, preferably the coil windings that form the coil sub-sets are alternately wound such that each coil produces a magnetic field that is anti-parallel with its adjacent coil/s for a given direction of current flow. As the magnets of the rotor of the motor sweep across the ends of the coils, appropriate switching of the currents in the coils can be used to create the desired forces for providing an impulse for the rotor.

However, in this configuration, to simplify the manufacturing process it is desirable that each stator tooth be wound independently of each other, which can be problematic as a single conducting wire needs to be used to form the respective coil sub-sets.

In accordance with an aspect of the present invention there is provided an arrangement and method according to the accompanying claims.

The present invention provides the advantage of allowing a plurality of stator teeth to be placed in a first position for allowing the cross-sectional area of coil windings mounted to the plurality of stator teeth to be maximised, while allowing the plurality of stator teeth to be placed in a second position after coil windings have been mounted to the plurality of stator teeth to facilitate mounting of the plurality of stator teeth to a stator back-iron.

As the stator teeth are separate from the stator back-iron they can be pre-wound with coil windings before the stator teeth are mounted to the stator back-iron with the advantage that the winding of coils on the teeth is easier than if the teeth were integral to the stator support. For example, the slot fill (i.e. the amount of copper wire that fills the slots between stator teeth) for conventional electric motor designs will be of the order of 37%. However, by allowing winding of coils to be applied to a stator tooth without the space constraints imposed when the stator is formed as a single piece with integral teeth the slot fill can be increased to approximately 54% or more. However, prior to the stator teeth being mounting onto a stator back-iron, the stator teeth are placed in a configuration corresponding to that when mounted on the stator back-iron, thereby simplifying the mounting process of the stator teeth to the stator back-iron.

The present invention will now be described, by way of example, with reference to the accompanying drawings, in which.

The embodiment of the invention described is an arrangement for placing a coil winding on to a stator tooth. Once a coil winding has been placed onto a stator tooth, the stator tooth is arranged to be mounted to a stator back iron to form a stator. The stator forms part of an electric motor or generator, where preferably the electric motor is for use in a wheel of a vehicle. However the electric motor may be utilised for any purpose. The motor is of the type where the stator is radially surrounded by a rotor carrying a set of magnets for attachment to a wheel. The definition of electric motor is intended to include electric generator. In addition, the motor arrangement is applicable to having the rotor centrally mounted within radially surrounding coils.

Figure 3:
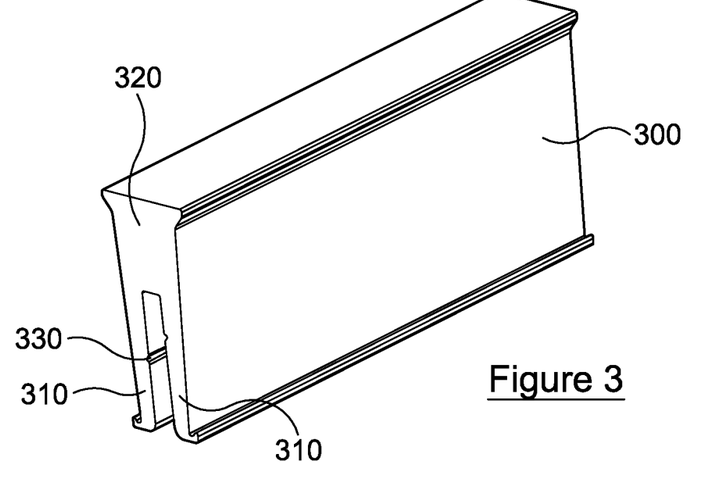
FIG. 3 illustrates a stator tooth according to an embodiment of the present invention.

For purposes of illustration, FIG. 3 illustrates one embodiment of a stator tooth 300 suitable for mounting to a protrusion formed on a stator back-iron after coil windings have been wound onto the stator tooth.

Figure 4:
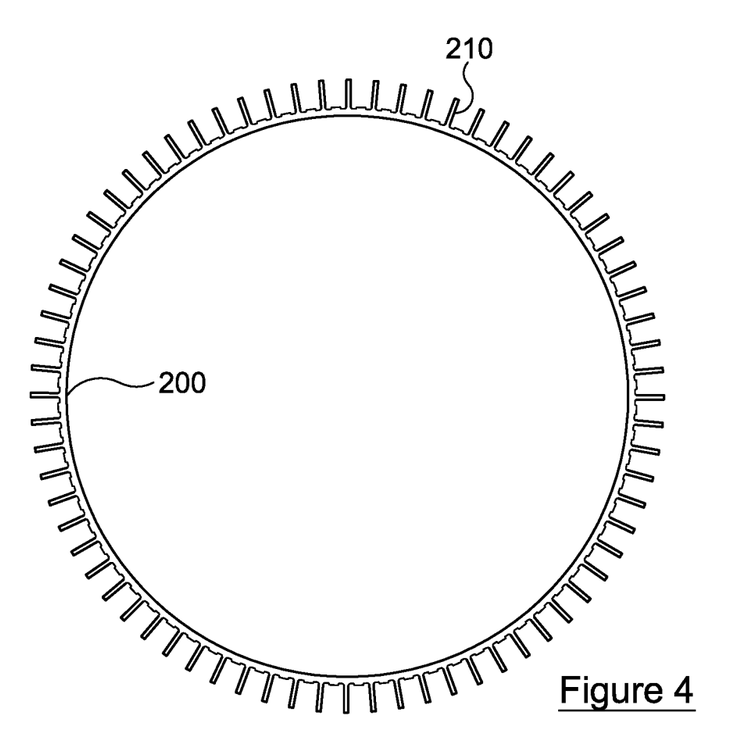
FIG. 4 illustrates a stator back-iron according to an embodiment of the present invention.

FIG. 4 provides an illustration of an embodiment of a stator back-iron 200 having a plurality of protrusions 210 distributed about the outer circumference of the stator back-iron 200 that act as engagement elements arranged to receive a stator tooth 300. The plurality of protrusions 210 extend radially outwardly away from the outer surface of the stator back-iron 200. However, in a different electric motor configuration the plurality of protrusions 210 can extend inwardly from the inner surface of the stator back-iron.

Preferably, the stator back-iron 200, including the protrusions 210, are formed as a single piece, integral, structural component. For example the stator back-iron 200 can be moulded from powder metal, or more commonly, built up of a number of identical laminations, where the laminations will typically be manufactured from sheets of steel, such as electrical steel, however any material with appropriate strength and electromagnetic properties can be used. The laminations may also have an insulating coating on the surface and along the curved interface shape between teeth stacks and stator back-ring (i.e. circumferential support 200) to prevent eddy currents from flowing between the laminations.

The laminations can be produced by any suitable means, for example stamping or cutting the desired shape from a sheet of the required material or laser etching. As an example, the laminations may have a thickness of between 0.3 and 0.4 mm and preferably around 0.35 mm.

The stator tooth 300 illustrated in FIG. 3 includes two wall sections 310 that are coupled together via a stator tooth top portion 320. To aid the retention of coil windings mounted on the stator tooth 300, the top portion 320 of the stator tooth extends laterally over the tooth wall sections 310 to form a laterally extending stator tip.

Figure 5:
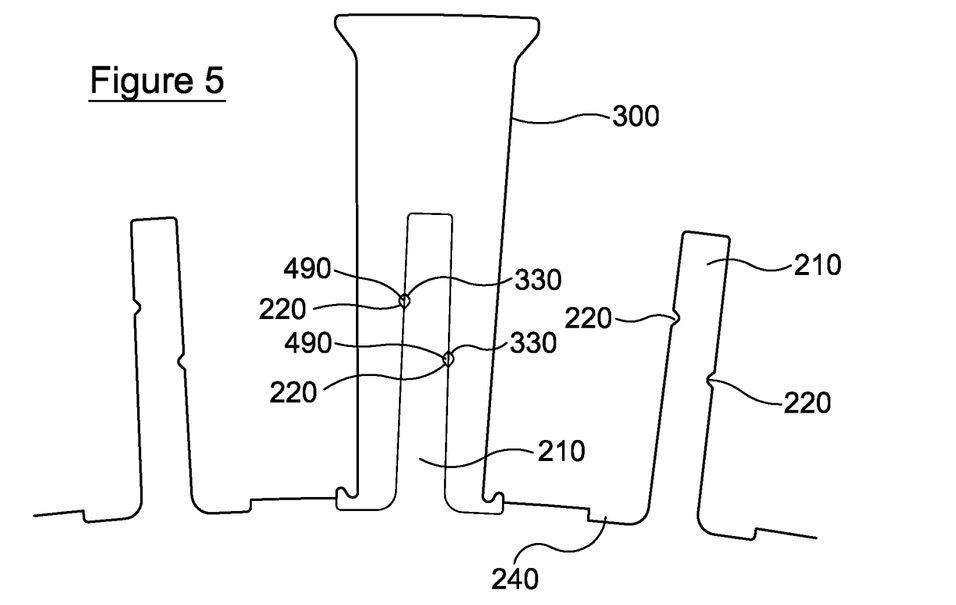
FIG. 5 illustrates a stator tooth mounted to a stator back-iron according to an embodiment of the present invention.

A recess is formed between the two tooth wall sections 310 of the stator tooth 300. The recess is sized to allow a stator back-iron protrusion 210 to be housed within the recess when the stator tooth 300 is placed over the protrusion 210, as illustrated in FIG. 5. Preferably, for improved thermal conductivity between the stator tooth 300 and the protrusion 210 the dimensions of the recess and the protrusions 210 are chosen to that any gaps between the walls of the stator tooth recess and the sides of the outer portion of the protrusion are minimised.

Preferably, the bottom portions of the two tooth wall sections are arranged to extend laterally and have corresponding dimensions to grooves 240 that runs along the stator back-iron 200 at the base of a protrusion 210 so that the laterally extended bottom portions of the two tooth wall sections 310 fit within the grooves 240 on the stator back-iron 200 when the stator back-iron protrusion 210 is housed within the stator tooth recess.

The recess formed in the stator tooth and the protrusions formed on the stator back-iron include engagement features for inhibiting removal of a stator tooth from a stator back-iron protrusion once a stator tooth has been mounted to a stator back-iron protrusion.

In one embodiment, the engagement features correspond to channels 220, 330 formed within the stator tooth recess and on the respective stator back-iron protrusions that allow material to be placed within the channels 220, 330 to allow a stator tooth 300 to be interlocked with a stator back-iron protrusion 210. The use of the term channel is intended to cover groove or any form of cavity that allows a material to be inserted. However, any suitable means may be used for interlocking a stator tooth and stator back-iron protrusion together once a stator tooth has been mounted onto a stator back-iron protrusion.

For the purposes of the present embodiment, however, to allow material to be placed within the channels to allow a stator tooth to be interlocked with a stator back-iron, both channels 330 formed on the stator tooth recess are arranged to align with a corresponding channel 220 on a stator back-iron protrusion 210 once the stator tooth 300 has been placed over the stator back-iron protrusion 210.

To minimise the risk of a stress point occurring on the protrusion 210, the channels 220 on each side of the protrusion 210 are offset with respect to one another, thereby ensuring that the width of the protrusion 210 at any point is not reduced by anything greater than the depth of a single channel 220.

As with the channels formed on the stator back-iron protrusions 210, preferably both stator tooth recess channels 330 extend the whole length of a respective wall section 310, however the length of the stator tooth recess channels 330 may be shortened, thereby only extending a portion of the length of a tooth recess wall section 210.

Further, the orientation of the channels 330 is not limited to running substantially parallel to the base of the tooth 300 and other orientations may be used that correspond with the orientation of the channels 220 formed on the protrusion 210.

Figure 6:
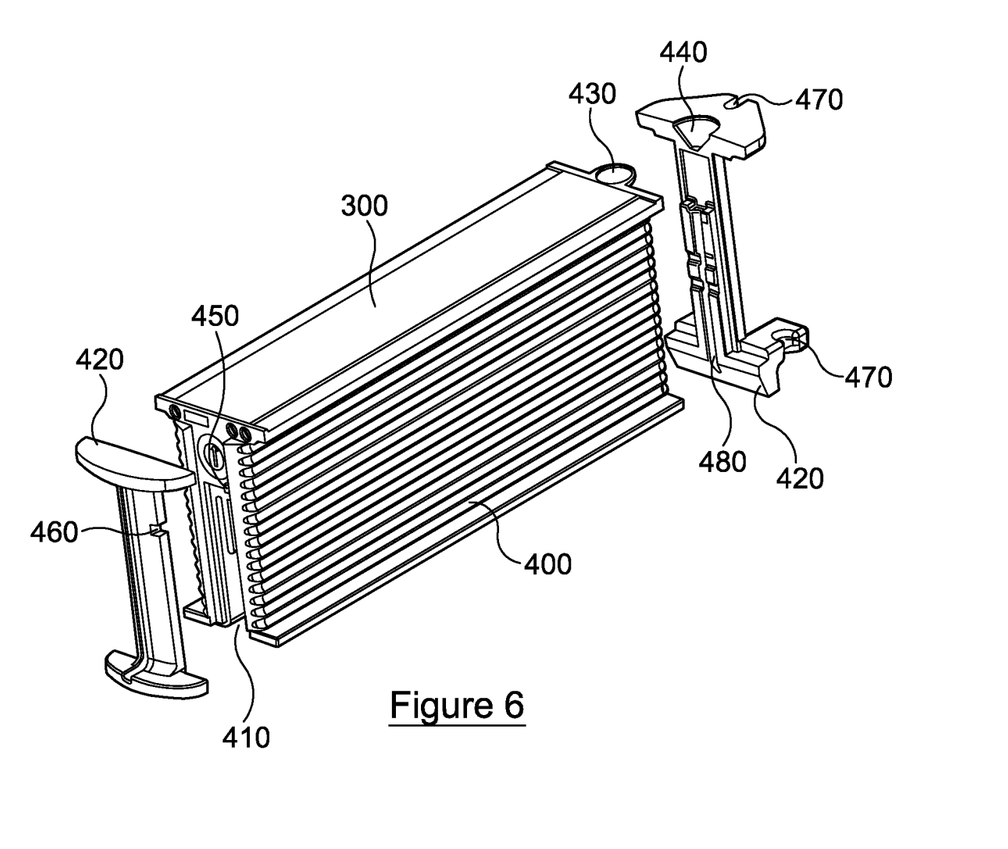
FIG. 6 illustrates a stator tooth according to an embodiment of the present invention.

FIG. 6 illustrates a further preferred feature, to aid electrically isolation between the coil windings and the stator tooth 300, the stator tooth 300 is encapsulated with an insulating material 400 using over-moulding (i.e. the stator tooth is over-moulded). Preferably the insulating material 400 will be a plastics material having a good thermal conductivity, high temperature deflection and good dielectric strength, for example liquid crystal polymer. Preferably the over-moulded material is selected to have good thermal conductive properties, thereby aiding thermal conductivity between the coil windings and the stator tooth 300. Preferably, the over-moulding process will include features that aid the retention of the coil windings on the stator tooth, for example a ridge formed at the bottom of the over-moulding.

As illustrated in FIG. 6, to facilitate the insertion of material between the channels 220, 330 formed on the adjacent surfaces of the recess wall sections 310 and the protrusion 210 a gap 410 is formed in the injection moulded plastics layer 400 on the two end sides of the tooth 300, where the gap 410 in the injection moulded plastics layer 400 extends from the bottom of the tooth 300 to the top of the recess. The injection moulded plastics layer 400 extends up from the bottom of the tooth 300 to the top of the laterally extending stator tip.

The forming of a gap in the injection moulded plastics layer 400 on the end sides of the tooth 300 has the additional advantage of minimising the inward pressure on the two wall sections 310 of the tooth when the injection moulded plastics layer 400 is being applied to the tooth 300. This avoids the need for structural supports to be placed between the two wall sections 310 for preventing the stator tooth wall sections 310 bending during the injection moulding process. As illustrated in FIG. 6, preferably the gap 410 in the injection moulded plastics layer 400 on the end sides of the tooth 300 extends to the top of the tooth recess.

As illustrated in FIG. 6, the injection moulded plastics layer 400 formed around the sides of the stator tooth 300 includes longitudinal ridges to facilitate winding the coil windings around the tooth 300 and to increase the contact surface area between the injection moulded plastics layer 400 and the coil windings for improved thermal conduction between the coil windings and the injection moulded plastics layer 400.

To aid electrical isolation between the coil windings and the stator tooth 300 at the end sections of the stator tooth 300, an electrically insulating element 420 is placed in the gaps 410 formed in the injection moulded plastics layer 400 before the coil windings are applied to the stator tooth 300. The electrically insulating elements 420 are arranged to electrically insulate the end sections of the tooth 300 from the coil windings wound around the tooth 300.

Although the preferred embodiment uses two insulating elements 420 placed in two gaps 410 formed on opposite sides of the injection moulded plastics layer 400, the injection moulded plastics layer 400 can be applied with a single gap 410 formed in the injection moulded plastics layer 400 at one end side of the tooth 300 with a single insulating element 420 being used to provide insulation at the end section of the tooth 300.

Preferably, the two insulation elements 420 have keying features that are arranged to match corresponding features formed in the injection moulded plastics layer 400 for facilitating the correct placement of the two insulation elements 420 in the respective gaps 410 formed in the injection moulded plastics layer 400. For the purposes of the present embodiment, an extended lip 430 is formed at the top of the injection moulded plastics layer 400 at one end of the stator tooth 300, with a corresponding recess 440 formed in the associated insulation element 420. On the other end of the stator tooth 300, a keying element 450 is formed on the edge of the injection moulded plastics layer 400 two thirds of the way up from the bottom of the stator tooth 300 with a corresponding recess 460 formed in the associated insulation element 420. However, any form of keying feature may be used.

Preferably, at least one of the insulation elements 420 have a channel 480 formed on an inner surface of the insulation elements 420 for allowing the material, for example potting or adhesive material, to be channelled between the channels 220, 330 formed on the adjacent surfaces of the recess wall sections 310 and the protrusion 210 when the insulation elements 420 are placed in the gaps formed in the injection moulded plastics layer 400 and the associated tooth 300 has been mounted to the stator back-iron 200.

By having a channel 480 formed on an inner surface of an insulation element 420 it is possible for material to be applied up through the channel and between the channels 220, 330 formed on the adjacent surfaces of the recess wall sections 310 and the protrusion 210 surfaces of the stator tooth recess and the stator back-iron after the stator tooth 300 has been mounted to the stator back-iron, where as stated above the potting material is used to retain the stator tooth 300 to the stator back-iron 200.

As stated above, to aid thermal conductivity between the stator tooth 300 and the stator back-iron 200 the adhesive/potting material is preferably selected to have a good thermal conductivity. The adhesive/potting material can also help to electrically isolate the stator tooth 300 from the protrusion 210, thereby helping to minimise eddy currents between stator tooth 300 and the stator back-iron 200.

Preferably at least one of insulation elements 420 includes at least one guiding feature 470 for aiding in the routing of a portion of the coil windings, as described below. A first guiding element 470 is provided at the top of the insulation element 420 for routing coil windings to/from a stator tooth 300 with two guiding elements 470 provided at the bottom of the insulation element 420 for routing coil windings between stator teeth 300.

Preferably, the injection moulded plastics layer 400 and the first and/or second insulation elements 420 are made of different materials.

As stated above, preferably the over-moulded material is selected to have good thermal conductive properties, thereby aiding thermal conductivity between the coil windings and the stator tooth 300. However, an over-moulded material selected for its optimum thermal conductive properties may not provide the optimum mechanical strength requirements required for guiding/routing portions of the coil windings. Accordingly, by having insulation elements 420 located at the end sides of the stator teeth 300 that do not form part of the injection moulded plastics layer 400 it is possible to select different materials for the insulation elements 420 and the injection moulded plastics layer 400 based on different priorities. For example, the material for the insulation elements 420 can be selected for optimum strength with the material for the injection moulded plastics layer 400 being selected for optimum thermal conductivity. As such, the injection moulded plastics layer 400 may have a higher thermal conductivity than the insulation elements 420 with the insulation elements 420 having greater mechanical strength than the injection moulded plastics layer 400. An example of a suitable injection moulded plastics layer would be CoolPoly® Thermally Conductive Liquid Crystalline Polymer. An example of a suitable material for the insulation elements would be Nylon PA66.

Preferably at least one side of the tooth 300 includes a retaining feature over which the injection moulded plastics layer is formed for preventing the injection moulded plastics layer 400 from peeling away from the side of the tooth 300.

Once the stator tooth 300 has been over-moulded and the insulating elements 420 have been placed in the gaps 410 formed in the end sides of the over-moulding, coil windings are applied to the stator tooth 300.

A preferred arrangement for mounting a coil winding to a plurality of stator teeth will now be described, where the mounting arrangement is described below.

For the purposes of the present embodiment, an electrical conductor, for example a wire such as a copper wire, is wound onto three stator teeth in series. The three coil wound stator teeth form an electric motor coil sub-set. Preferably, the copper wire is insulated to prevent the coil windings shorting. Although the preferred embodiment describes a coil sub-set as having coils wound on three stator teeth to form a coil sub-set having three coils in series, a coil sub-set may comprise coil windings applied to any number of stator teeth. For example, a coil sub-set may comprise coils wound onto two stator teeth to form a coil sub-set having two coils in series.

Figure 7:
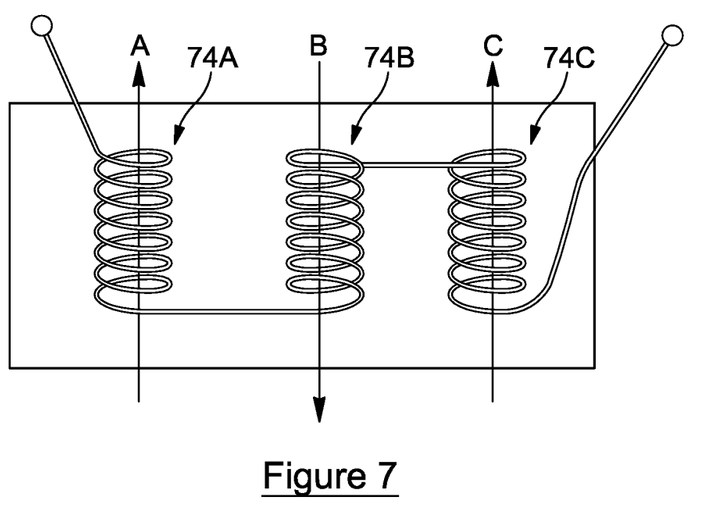
FIG. 7 schematically shows an example arrangement of coils forming a coil sub-set according to an embodiment of the present invention.

As shown schematically in FIG. 7 the three coils that form the coil sub-set are labelled 74A, 74B, 74C. The three coils A, B, C are alternately wound such that each coil produces a magnetic field that is anti-parallel with its adjacent coil/s for a given direction of current flow.

Figure 8:
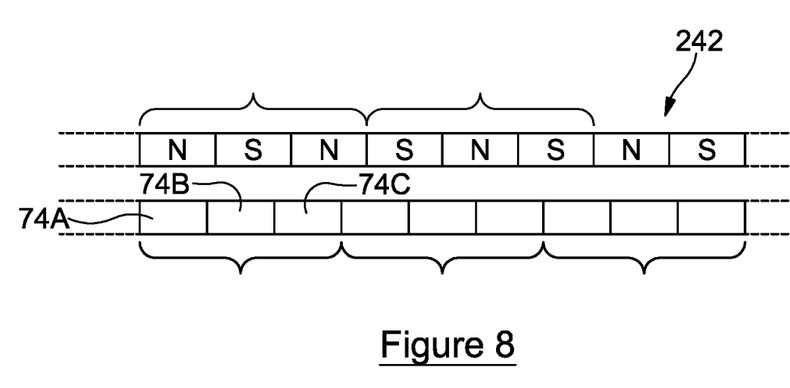
FIG. 8 schematically shows stator coils in relation to rotor magnets.

The reason that the coils 74A, 74B, 74C within each coil sub-set are wound in an opposite direction relative to each other is to provide anti parallel magnetic fields, is explained with reference to FIG. 8. FIG. 8 shows an arrangement of magnets on the rotor surrounding the coils 74A, 74B, 74C of the stator. For simplicity, the arrangement is shown as a linear arrangement of magnets and coils, but it will be understood that in the embodiment of the invention described the coils will be arranged around the periphery of the stator with the magnets arranged around the inside of the circumference of the rotor.

The magnets are arranged with alternative magnetic polarity towards the coil subsets 74A, 74B, 74C resulting in each subset of three coils 74A, 74B, 74C presenting alternate magnetic fields to the alternate pole faces of the magnets. Thus, when the left hand coil of a sub-set has a repelling force against a North Pole of one of the magnets, the adjacent central coil will have a repelling force against a South Pole of the magnets and so on.

As shown schematically in FIG. 8, the ratio of magnets to coils is eight magnets to nine coils. The advantage of this arrangement is that the magnets and coils will never perfectly align. If such perfect alignment occurred, then the motor could rest in a position in which no force could be applied between the coils and the magnets to give a clear direction as to which sense the motor should turn. By arranging for a different number of coils and magnets around the motor, there would always be a resultant force in a particular direction whatever position the rotor and motor come to rest.

However, in an alternative embodiment the coil windings may not be alternately wound upon adjacent stator teeth.

Figure 9:
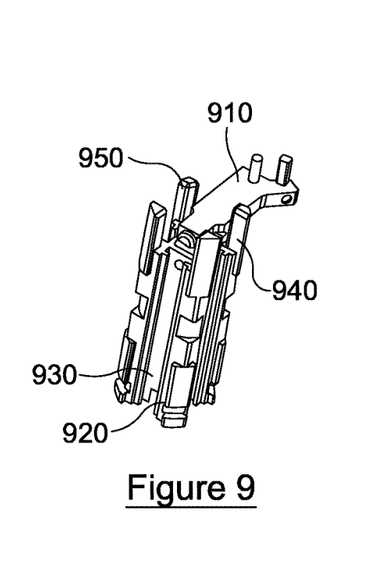
FIG. 9 illustrates a mounting arrangement according to an embodiment of the present invention.
Figure 10:
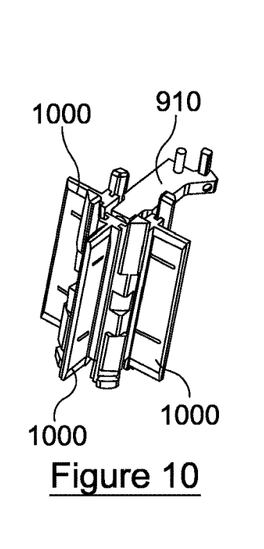
FIG. 10 illustrates a tooth mounting segment according to an embodiment of the present invention.

FIG. 9 illustrates a mounting arrangement 900 according to an embodiment of the present invention for allowing a coil winding to be wound onto a plurality of stator teeth in series. Preferably the mounting arrangement 900 includes a mounting element 910, for example a spindle, and a plurality of tooth mounting segments 1000, one for each tooth that a coil winding is to be applied to. An illustration of a tooth mounting segment 1000 is shown in FIG. 10.

The mounting arrangement 900 is configured to allow three stator teeth to be mounted to the mounting element 910, where coil windings are arranged to be wound onto the respective stator teeth when the stator teeth are placed on the mounting element 910 in a first position relative to each other. The mounting element then allows the stator teeth to be placed in a second position, shown in FIG. 15, relative to each other to allow removal of the stator teeth and coil windings from the mounting element for mounting to a stator back-iron, as described below.

The mounting element 910 is secured in a fixed position during the coil winding process to allow the stator teeth, which are mounted to the mounting element 910 via a respective tooth mounting segment 1000, to be held in a fixed configuration. The securing of the mounting element 910 in a fixed position ensures that the stator teeth are in a predetermined position to allow the coil winding process to be automated.

As illustrated in FIG. 9, the mounting element 910 includes a first mounting arm 920 having a first retaining channel 930 that is arranged to receive a first tooth mounting segment 1000 slidably placed into the first retaining channel 930 for securing the first tooth mounting segment 1000 to the mounting element 910.

Figure 15:
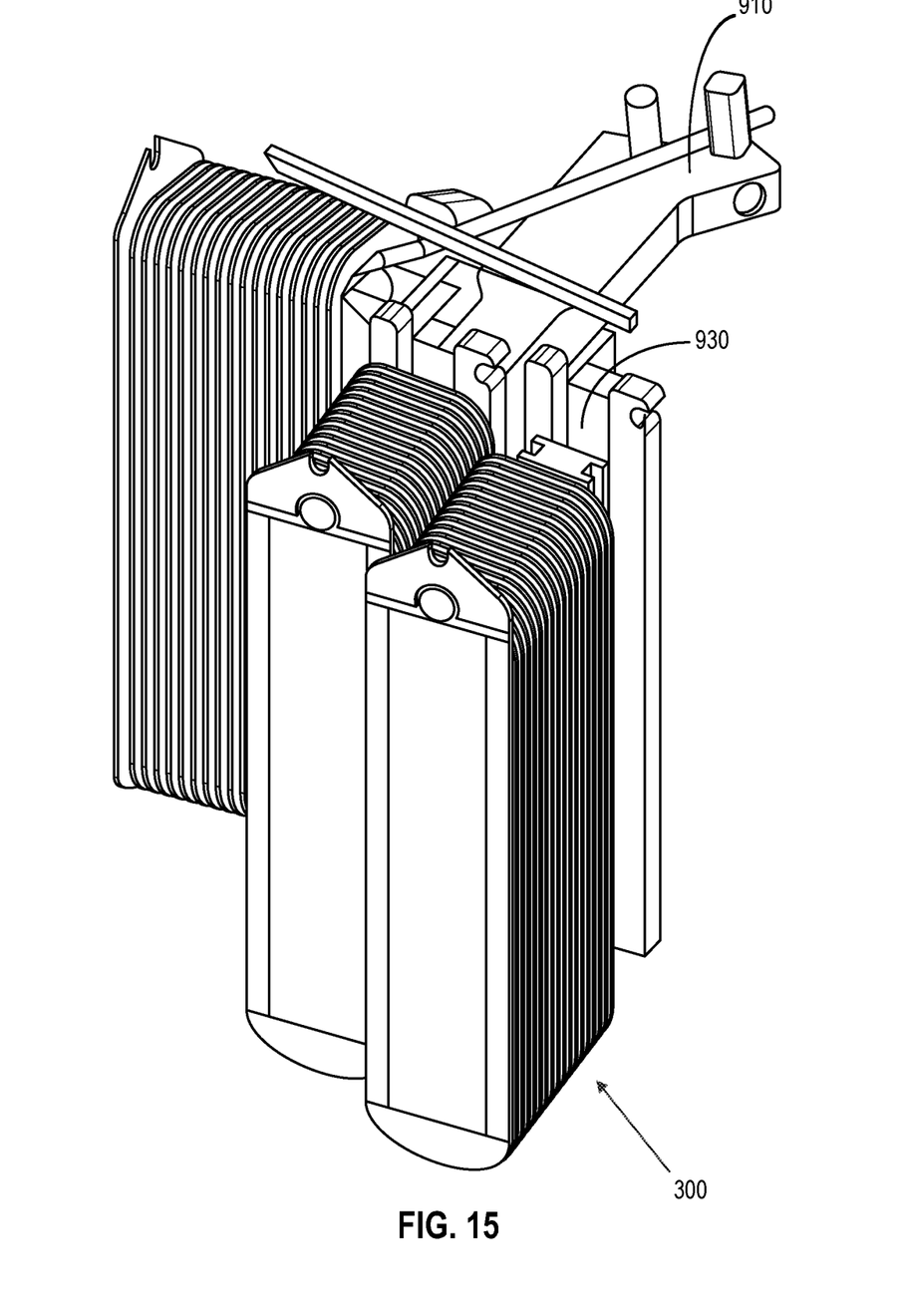
FIG. 15 illustrates a mounting arrangement according to an embodiment of the present invention.

Pivotally coupled on one side of the first mounting arm 920 is a second mounting arm 940 having a second retaining channel that is arranged to receive a second tooth mounting segment 1000 slidably placed into the second retaining channel for securing the second tooth mounting segment to the mounting element. The second mounting arm 940 is capable of pivotally moving from a first position relative to the first mounting arm 920 to a second position as shown in FIG. 15.

Although the second mounting arm 940 can be arranged to move between any two angles relative to the first mounting arm 920, preferably, when the second mounting arm 940 is in the first position relative to the first mounting arm 920, the second mounting arm 940 is substantially orthogonal to the first mounting arm 920, as illustrated in FIG. 9.

Figure 11:
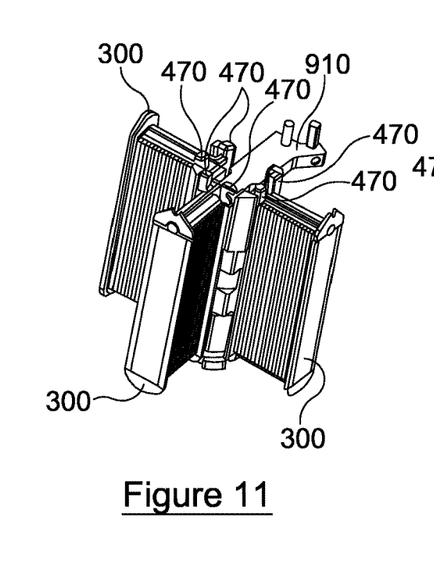
FIG. 11 illustrates a mounting arrangement according to an embodiment of the present invention.

When the second mounting arm 940 is in the second position relative to the first mounting arm 920, preferably the second mounting arm 240 is substantially in line with the first mounting arm 920, as illustrated in FIG. 11. However, as stated above, the relative position of the second mounting arm 940 to the first mounting arm 920 when in the respective first and second position may take other angles.

Pivotally coupled on the other side of the first mounting arm 920 is a third mounting arm 950 having a third retaining channel that is arranged to receive a third tooth mounting segment 1000 slidably placed into the third retaining channel for securing the third tooth mounting segment 1000 to the mounting element 910.

Although the third mounting arm 950 can be arranged to move between any two angles relative to the first mounting arm 920, preferably, when the third mounting arm 950 is in the first position relative to the first mounting arm 920, the third mounting arm 950 is substantially orthogonal to the first mounting arm 920, as illustrated in FIG. 9.

When the third mounting arm 950 is in the second position relative to the first mounting arm 920, preferably the third mounting arm 950 is substantially in line with the first mounting arm.

However, as stated above, the relative position of the third mounting arm 950 to the first mounting arm 920 when in the respective first and second position may take other angles.

As illustrated in FIG. 10, the first, second and third tooth mounting segments 1000 each include a mounting section 1010, where the mounting sections 1010 are arranged to engage with a respective stator tooth for allowing the respective stator teeth to be mounted on a mounting element segment 1000. Additionally, the first, second and third tooth mounting segments 1000 include a channel section 1020 for slidably mounting to a mounting arm.

For the purposes of the present embodiment, the mounting sections 1010 of the first, second and third tooth mounting segments 1000 have dimensions corresponding to a stator back-iron protrusion for allowing the respective mounting sections 1010 to be push fit into a stator tooth recess, thereby allowing a stator tooth to be coupled to a respective tooth mounting segment 1000 in a similar manner as that used for mounting a stator tooth to a stator back-iron protrusions.

Once a stator tooth 300 has been mounted to the first, second and third tooth mounting segments 1000 respectively, each of the tooth mount segments 1000 are slidably mounted onto a respective mounting arm via the respective first, second and third retaining channels formed on the first, second and third mounting arms. Alternatively, the first, second and third tooth mounting segments 1000 can be slidably mounted onto a respective mounting arm before a stator tooth has been attached to the tooth mounting segments 1000, with a stator tooth being mounted to a respective tooth mounting segment 1000 once the respective tooth mounting segments 1000 have been slidably mounted to a respective mounting arm, where FIG. 11 illustrates the mounting element 910 with tooth mounting segments 1000 mounted to the first, second and third mounting arms ready to receive a stator tooth.

Figure 12:
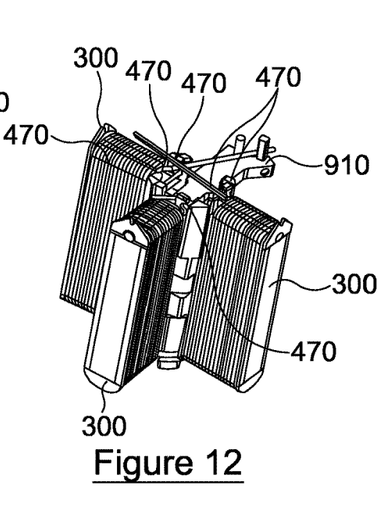
FIG. 12 illustrates a mounting arrangement according to an embodiment of the present invention.

Once a stator tooth 300 has been mounted to each of the mounting assembly mounting arms via a respective tooth mounting segment 1000, the mounting arms are positioned to be substantially orthogonal with respect to each other, as illustrated in FIG. 12. By positioning the stator teeth 300 so that they are substantially orthogonal with respect to each other allows coil windings to be wound on to each of the teeth without the other stator teeth obstructing the winding process, thereby simplifying the winding process and allowing the cross sectional area of the coil windings to be maximised.

To mount coil windings onto the stator teeth 300 a coil winding assembly (not shown) initiates the winding process by first using a guiding feature 470 on the second stator tooth mounted on the second mounting arm 940 to hook the wire onto the second stator tooth for securing the wire to the second stator tooth during the winding process. The coil winding assembly then winds the wire around the second stator tooth using the longitudinal ridges formed in the injection moulded plastic layer 400 to facilitate the even placement of the wire on the stator tooth.

For the purposes of the present embodiment two layers of windings are wound on the stator tooth, however any number of layers may be wound on the stator tooth.

Once the wire has been wound on the second stator tooth the coil winding assembly hooks the wire on a second guiding feature 470 on the second stator tooth to fix the end section of the wire applied to the second stator tooth and moves the wire to the first stator tooth, which as stated above is placed orthogonally to the second stator tooth during the winding process. The coil winding process is repeated on the first stator tooth, where a first and second guiding feature 470 on the first stator tooth is used to secure the beginning and end sections of the coil windings to the stator tooth in a similar fashion to that for the second stator tooth. Preferably, the wire is wound on the first stator tooth in an opposite direction to that on the second stator tooth, as described above.

For the purposes of the present embodiment two layers of windings are wound on the stator tooth, however any number of layers may be wound on the stator tooth.

Once the wire has been wound on the first stator tooth the coil winding assembly moves the wire to the third stator tooth mounted on the third mounting arm 950, which as stated above is placed orthogonally to the first stator tooth during the winding process. The coil winding process is repeated on the third stator tooth, where a first and second guiding feature 470 on the third stator tooth is used to secure the beginning and end sections of the coil windings to the stator tooth in a similar fashion to that for the first and second stator teeth. Preferably, the wire is wound on the third stator tooth in an opposite direction to that on the first stator tooth, but the same direction as that for the second stator tooth, as described above.

For the purposes of the present embodiment two layers of windings are wound on the stator tooth, however any number of layers may be wound on the stator tooth.

Figure 13:
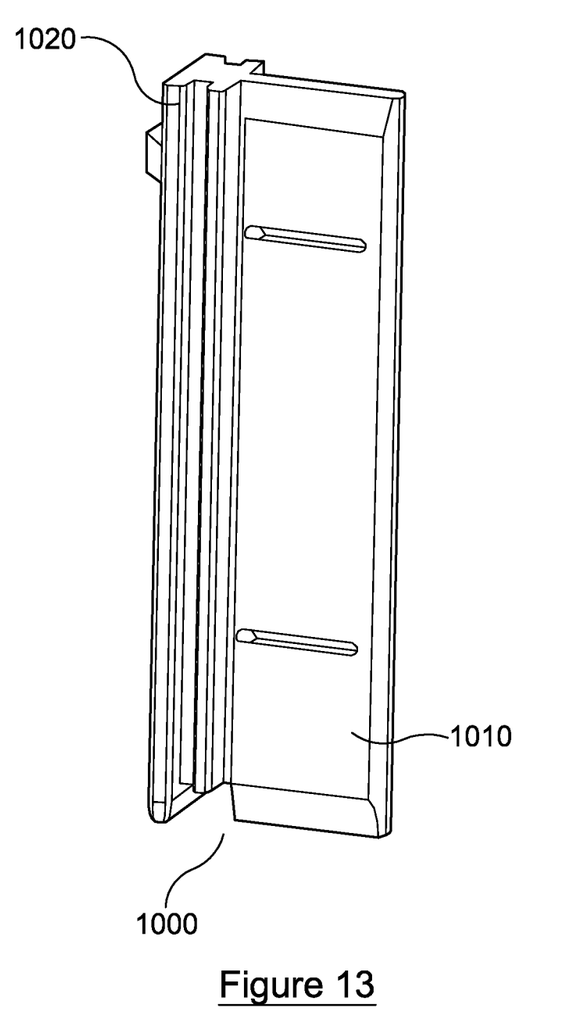
FIG. 13 illustrates a mounting arrangement according to an embodiment of the present invention.

FIG. 13 illustrates the mounting element 910 with coil windings mounted on the respective stator teeth while the mounting arms and stator teeth are placed in the first position.

Although the above embodiment describes the winding assembly moving the wire from the second stator tooth to the first stator tooth and then to the third stator tooth, equally the mounting element 910 can be arranged to move relative to the coil winding assembly for allowing wire to be wound upon the second stator tooth, the first stator tooth and the third stator tooth in series.

Once the wire has been wound onto the first stator tooth, the second stator tooth and the third stator tooth, a pressing tool (not shown) is used to press, commonly known as coil crushing, the coil windings mounted on the first stator tooth, the second stator tooth and the third stator tooth so that the coil windings are as close as possible to the surface of the respective stator teeth, thereby maximising the cross sectional area of the coil windings that can be mounted to a stator tooth without contact occurring between coil windings on adjacent stator teeth when mounted on a stator back-iron.

Figure 14:
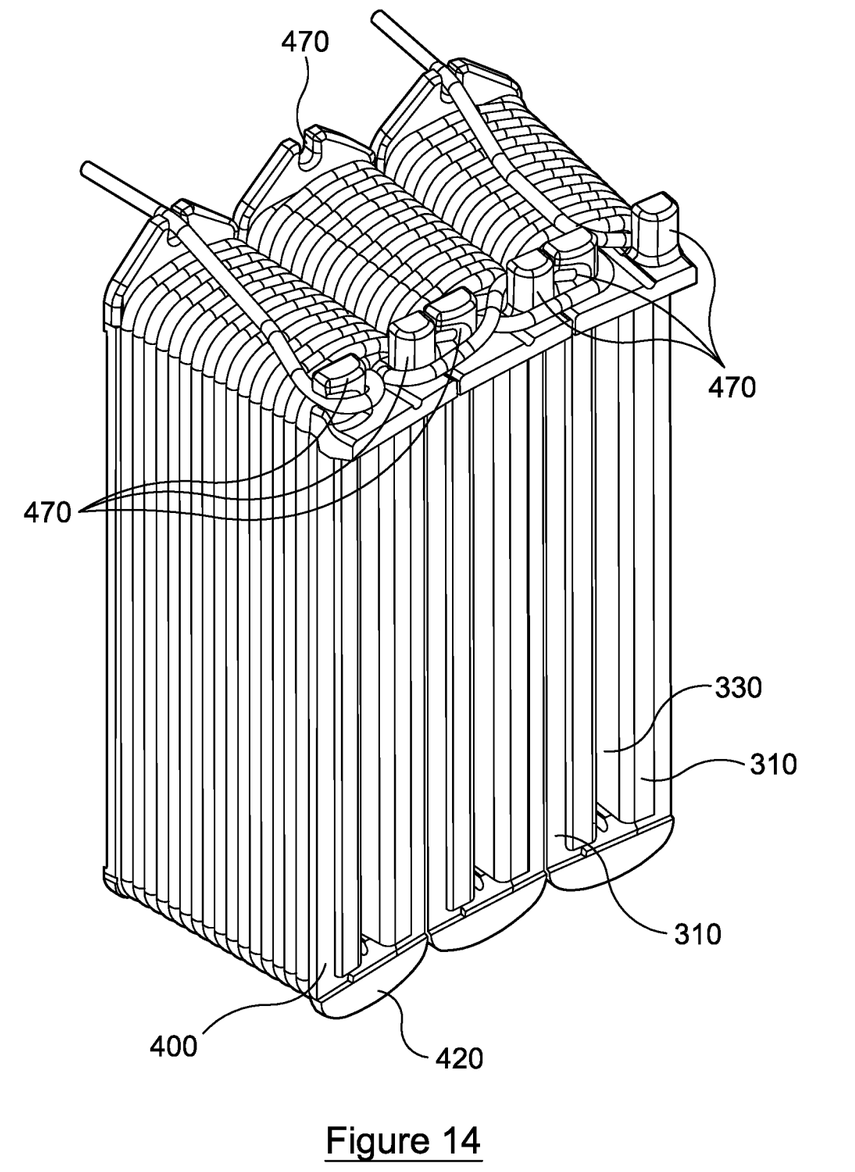
FIG. 14 illustrates a mounting arrangement according to an embodiment of the present invention.

To facilitate mounting of the stator teeth to the stator back-iron 210, once the coil windings have been pressed, the second mounting arm 940 and the third mounting arm 950 are rotated from the first position to the second position to substantially align the first stator tooth, the second stator tooth and the third stator tooth with respect to each other to allow the stator teeth mounted to their respective tooth mounting segment to adopt a configuration corresponding to that when they are mounted on the stator back-iron. Therefore, preferably, in the second position the stator teeth will have an inner circumference corresponding to the stator back-iron. Further, by rotating the second stator tooth and third stator tooth so that the first, second and third stator teeth are substantially aligned this allows the stator teeth 300 to be removed from the tooth mounting segments 1000 by pulling the stator teeth 300 from the tooth mounting segments 1000, where FIG. 14 illustrates the position of the stator teeth once they have been removed from the tooth mounting segments 1000.

To mount the coil sub-set, namely the first stator tooth, the second stator tooth and the third stator tooth, to the stator back-iron 200 the respective stator teeth 300 are radially pressed onto a respective protrusion 210 formed on the stator back-iron 200 and preferably a material is inserted between the channels 220, 330 formed on adjacent surfaces of the recess wall sections 310 and the protrusion 210. Preferably, the material is a fluid that is arranged to harden once the material has been inserted between the channels 220, 330 formed on adjacent surfaces of the recess wall sections 310 and the protrusion 210, for example as part of a curing process such as a polymer material arranged to harden by cross-linking of polymer chains brought about by chemical additives, ultraviolet radiation, electron beam or heat. Other examples of suitable material include a polyurethane potting material, or a silicone potting material.

One example of a suitable material would be an epoxy polymer material where the ratio/weight of resin and curing agent, otherwise known as a hardening agent, are selected and blended together prior to the material being inserted between the channels 220, 330 formed on the adjacent surfaces of the recess wall sections 310 and the protrusion 210. The blended compound is then inserted between the channels 220, 330 formed on the adjacent surfaces of the recess wall sections 310 and the protrusion 210. To improve the flow of the material into the channels 220, 330 formed between the recess wall sections 310 and the protrusions 210 warming of the material and/or the stator assembly can be performed.

Once the material has hardened, the hardened material acts as a retention pin 490 that locks the stator tooth 300 to the stator back-iron 200, where the increased shear strength of the hardened material inhibits the radial movement of the stator tooth 300 relative to the stator back-iron 200. As illustrated in FIG. 4, the hardened material extends into the channel 220 formed on the protrusion 210 and the channel 330 formed on the recess wall section 310, thereby preventing the stator tooth 300 from being removed from the protrusion with the hardened material acting as an interlocking element.

Although the preferred embodiment uses a fluid, arranged to harden as part of a curing process, as a retention pin 490 for interlocking a stator tooth 300 to the stator back-iron 200 other materials may be used, for example solid elements that are inserted between the channels 220, 330 formed on the adjacent surfaces of the recess wall sections 310 and the protrusion 210.

However, the use of a fluid that hardens after being inserted into the channels formed on the protrusion 210 and the recess wall sections 310 has the advantage of allowing the retaining element to be relatively easily injected into the channels after the stator tooth, with coil windings mounted to the stator tooth, has been mounted over a protrusion.

The invention claimed is:

1. An arrangement for mounting a coil winding on a stator tooth, the arrangement comprising:
a mounting element comprising:
a first mounting arm for receiving a first stator tooth; and
a second mounting arm for receiving a second stator tooth,
wherein:
the first mounting arm is pivotable relative to the second mounting arm between a first position and a second position;
an electrical conductor may be mounted on the first stator tooth and the second stator tooth when the first mounting arm is in the first position relative to the second mounting arm to form a coil winding on the first stator tooth and the second stator tooth; and
placing the first mounting arm in the second position relative to the second mounting arm when the conductor has been mounted on the first stator tooth and the second stator tooth allows the first stator tooth and the second stator tooth to be removed from the first mounting arm and the second mounting arm respectively.

2. An arrangement according to claim 1, wherein the electrical conductor is an insulated electrical wire.

3. An arrangement according to claim 1, wherein the position of the first mounting arm is substantially ninety degrees relative to the second mounting arm when the first mounting arm is in the first position relative to the second mounting arm.

4. An arrangement according to claim 1, further comprising a first coupling element for mounting into a recess formed in the first stator tooth, wherein the first coupling element is arranged to be slidably mounted to the first mounting arm.

5. An arrangement according to claim 1, further comprising a second coupling element for mounting into a recess formed in the second stator tooth, wherein the second coupling element is arranged to be slidably mounted to the second mounting arm.

6. An arrangement according to claim 1, wherein:
the mounting element includes a third mounting arm for receiving a third stator tooth,
the third mounting arm is movable relative to the second mounting arm between a third position and a fourth position; and
placing the third mounting arm in the fourth position relative to the second mounting arm when the conductor has been mounted on the first stator tooth, the second stator tooth and the third stator tooth allows the first stator tooth, the second stator tooth and the third stator tooth to be removed from the first mounting arm, the second mounting arm and the third mounting arm respectively.

7. A method for mounting a coil winding on a stator tooth using an arrangement comprising a first mounting arm and a second mounting arm, the method comprising:
mounting a first stator tooth on the first mounting arm and mounting a second stator tooth on the second mounting arm, wherein the first mounting arm is pivotable relative to the second mounting arm between a first position and a second position;
mounting an electrical conductor on the first stator tooth and the second stator tooth when the first mounting arm is in the first position relative to the second mounting arm to form a coil winding on the first stator tooth and the second stator tooth; and
placing the first mounting arm in the second position relative to the second mounting arm when the conductor has been mounted on the first stator tooth and the second stator tooth to allow the first stator tooth and the second stator tooth to be removed from the first mounting arm and the second mounting arm respectively.

8. A method according to claim 7, wherein the electrical conductor is wound on first stator tooth and the second stator tooth to form coil windings.

9. A method according to claim 7, further comprising rotating the first mounting arm and the second mounting arm to form coil windings on the first stator tooth and the second stator tooth respectively.

10. A method according to claim 7, further comprising compressing the coil windings formed on the first stator tooth and the second stator tooth when the first mounting arm is in the first position relative to the second mounting arm.

11. A method according to claim 7, further comprising slidably mounting the first stator tooth to the first mounting arm and slidably mounting the second stator tooth to the second mounting arm.

* * * * *